No. 633,843. Patented Sept. 26, 1899.
C. HOYT.
MEAT RACK.
(Application filed Jan. 28, 1899.)
(No Model.)
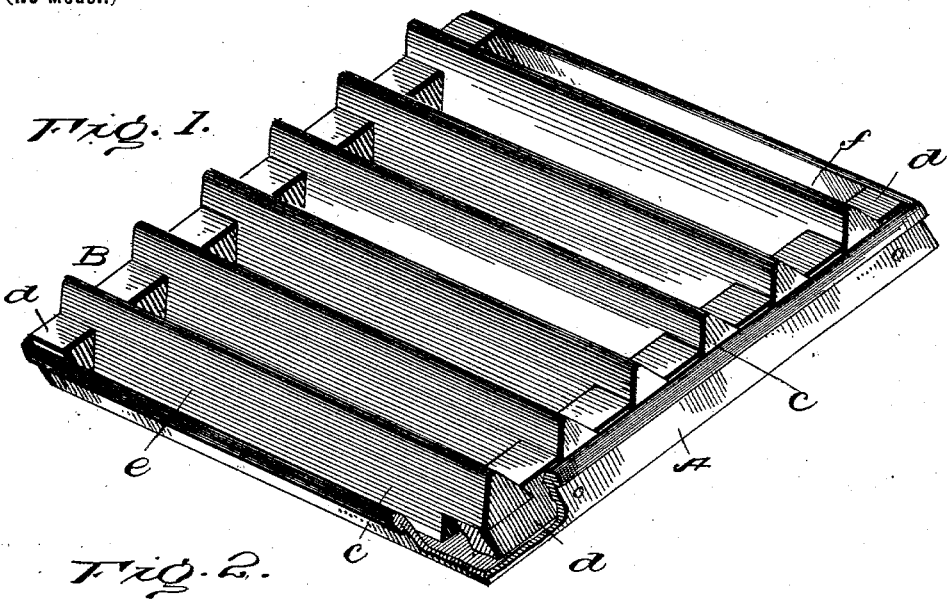
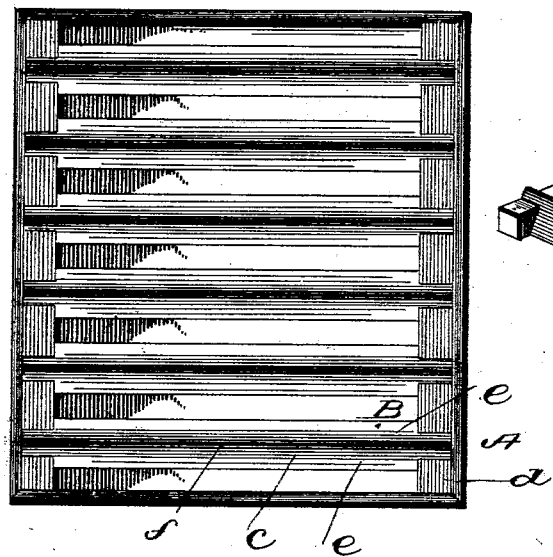
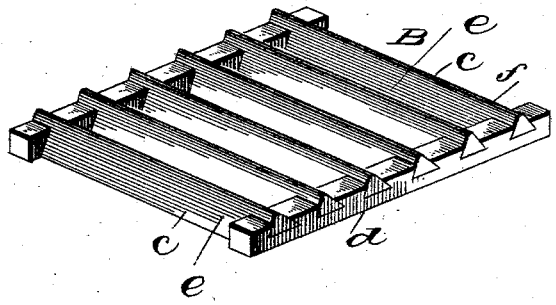
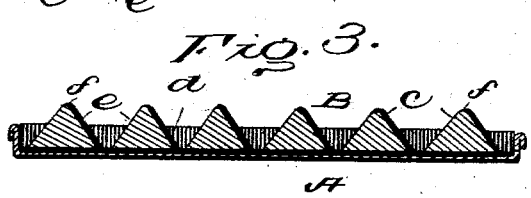
Witnesses
Inventor
Cyrus Hoyt
by R. S. & A. B. Lacey, his Attorneys

UNITED STATES PATENT OFFICE.

CYRUS HOYT, OF STAMFORD, CONNECTICUT.

MEAT-RACK.

SPECIFICATION forming part of Letters Patent No. 633,843, dated September 26, 1899.

Application filed January 28, 1899. Serial No. 703,721. (No model.)

*To all whom it may concern:*

Be it known that I, CYRUS HOYT, a citizen of the United States, residing at Stamford, in the county of Fairfield and State of Connecticut, have invented certain new and useful Improvements in Meat-Racks; and I do hereby declare the following to be a full, clear, and exact description of the invention, such as will enable others skilled in the art to which it appertains to make and use the same.

This invention relates to improvements in meat-racks, such as are designed to be placed in refrigerators and ice-boxes for supporting meats which are to be kept in a refrigerated state for preservation; and the purpose of the same is to provide a rack which will retain cold to a desirable extent, permit of the ready flow of and collect the drippings, and support the meat in such manner that it will not turn black or become slimy, and which possesses other advantages in point of simplicity of construction, durability, and general efficiency.

With this and other minor objects in view the invention consists of certain novel features of construction and arrangement of parts, which will be hereinafter more fully described and claimed, reference being had to the accompanying drawings, forming a part of this specification, and in which—

Figure 1 is a perspective view of a meat-rack constructed in accordance with my invention. Fig. 2 is a top plan view of the same. Fig. 3 is a longitudinal sectional view. Fig. 4 is a perspective view of the rack proper detached.

Referring now more particularly to the drawings, A represents a shallow pan or tray which serves as a holder for the rack and a receptacle to catch and retain the drippings from the meat supported on the rack. This pan is constructed of sheet metal, galvanized or otherwise prepared to resist deleterious effects from the action of fluids coming in contact therewith. It may be rectangular or of any other preferred form to adapt it for use in refrigerators, ice-boxes, or other receptacles of different sizes and forms and may be provided with one or more handles for convenience in lifting, inserting, and removing or transporting it from place to place.

The rack B consists of a series of spaced parallel metallic rods or bars $c$, rigidly connected by dovetailing or otherwise to metallic end bars $d$, which hold them in fixed relation to each other. This rack fits snugly in the pan and is preferably permanently attached thereto by suitable fastening devices, such as rivets, passed through the end bars and adjacent sides of the pan; but it may be removably fitted therein, if desired. Solid rods and end bars are employed to provide a large area of metallic surface to store up and retain cold—a desideratum in racks of this character.

The rods $c$ are triangular in form in cross-section and have their lower sides or base portions resting on the bottom of the pan, so as to form a series of chambers adapted to receive the drippings from the meat. The sides $e$ of the rods are also arranged to face each other and form inclined conductors, down which the drippings flow to the chambers, and the upper edges $f$ thereof are slightly curved or rounded, as shown. The object of this construction and arrangement is to allow the blood and other drippings to quickly drain off and not remain in contact with the meat, while providing supporting-surfaces which are not sharp enough to cut or otherwise injure the hands of a person handling the rack, but which at the same time present such a small area of contacting surface that the meat when laid thereon will not turn black or become slimy. These features are of material importance, and the advantages thereof will be readily understood by those conversant with the art. The rods project a sufficient distance above the sides of the pan to hold the meat out of contact therewith and permit of a free circulation of cold air.

Heretofore it has been customary to employ racks for the purpose stated composed of wooden bars or of fluted or corrugated metal plates. Wooden racks have, however, been found objectionable, because they become quickly soaked or impregnated with blood and other matter dripping from fresh meats and brine from corned meats and are in consequence difficult to clean and liable to accumulate dirt and germs of disease, which quickly cause the meat to spoil, and, further, because it is necessary in order to provide a rack of the requisite strength to sustain heavy pieces of meat to make the bars so large that an undesirable amount of contact-surface is presented. Fluted, corrugated, and channeled plates have also been found objectionable for the reason that they do not retain cold to the required extent to prevent spoiling of the meat when the ice is low in the refrigerator or ice-box, do not permit of a free circulation of air, present too much contact-surface, and retain the drippings in too close proximity to the meat. My invention entirely obviates these objections, as the supporting-rods of the rack are solid and readily store up and retain cold, while they are easily cleaned, have a minimum amount of contacting surface, and hold the meat a sufficient distance above the bottom of the pan to allow air to freely circulate beneath the same and at the same time prevent the drippings from having access thereto. The inclined sides of the rods also provide for the ready and quick flow of the drippings and water of condensation therefrom, so that the upper edges thereof are always kept in a cleanly condition.

While the preferred form of my invention is herein disclosed, it will of course be understood that changes in the form, proportion, and minor details of construction may be made within the scope of the invention without departing from the spirit or sacrificing any of the advantages thereof.

Having thus described the invention, what is claimed as new is—

A meat-rack consisting, essentially, of a sheet-metal pan or tray, and a drain and supporting-rack inclosed therein, which rack comprises in its construction a pair of solid end bars bearing against opposite sides of the pan and a series of independent, solid, triangular-shaped rods extending between and connected to the bars, said rods being spaced apart with their inclined sides facing each other and their broad base portions seated on the bottom of the pan so as to form intervening V-shaped chambers to which the said inclined sides serve as conductors and being of greater depth than the bars and pan so that their upper edges or apexes stand above the plane thereof, and having said edges slightly curved or rounded, substantially as and for the purpose described.

In testimony whereof I affix my signature in presence of two witnesses.

CYRUS HOYT. [L. S.]

Witnesses:
CLEMENT A. FULLER,
WILLIAM F. WATERBURY.